(Model.)

L. D. FRENOT.
NUT LOCK.

No. 514,315.  Patented Feb. 6, 1894.

INVENTOR:
Louis Désiré Frenot,
By G. Dittman,
Attorney.

WITNESSES:

THE NATIONAL LITHOGRAPHING COMPANY,
WASHINGTON, D. C.

UNITED STATES PATENT OFFICE.

LOUIS DÉSIRÉ FRENOT, OF NEWARK, NEW JERSEY.

NUT-LOCK.

SPECIFICATION forming part of Letters Patent No. 514,315, dated February 6, 1894.

Application filed April 15, 1893. Serial No. 470,511. (Model.)

*To all whom it may concern:*

Be it known that I, LOUIS DÉSIRÉ FRENOT, a citizen of the United States, residing at Newark, in the county of Essex and State of New Jersey, have invented certain Improvements in Nut-Locks, of which the following is a specification.

This invention relates to certain improvements in nut locks and has for its object to provide a device of this character of an improved construction over similar devices heretofore employed, all as will be hereinafter fully set forth.

The novel features of my invention will be carefully defined in the claim.

In order that my invention may be the better understood, I have illustrated it in the accompanying drawings, wherein—

Figure 1:
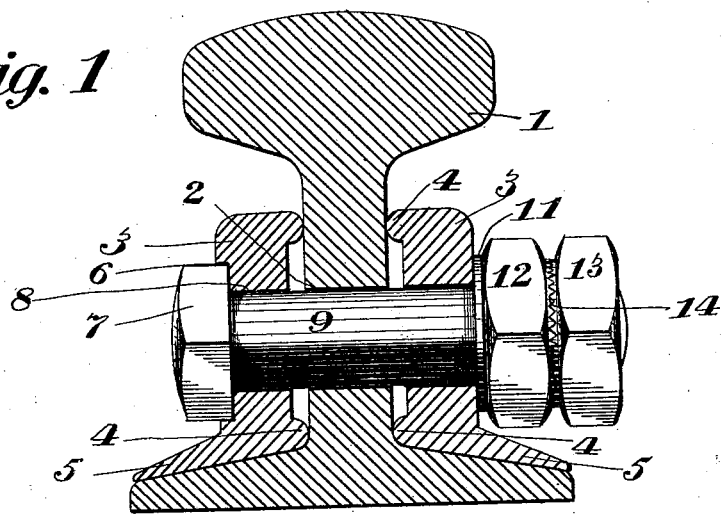
Figure 2:
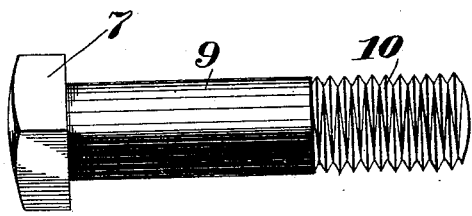
Figure 3:
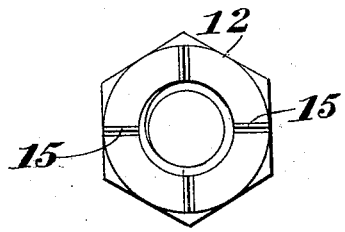
Figure 4:
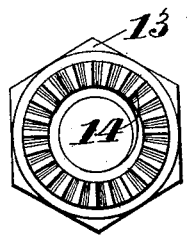

Figure 1 is a cross section of a railway joint with fish-plates united by my improved lock nut, and Fig. 2 is a view of the bolt detached. Fig. 3 is a view of a modified form of one of the nuts for use in my device, and Fig. 4 is a view of the other of said nuts.

In the views 1 is the rail, the web of which is perforated at 2 in the usual manner, and 3 3 are fish plates having ribs 4 on their inner faces at bottom and top. These fish plates are also provided with flanges 5, 5, at their lower outer portions, which flanges are beveled to fit and overlie the rail flange. One of these plates 3 is also provided on its outer face with a depression 6 to receive the head 7 of the bolt 9 which passes through apertures 8 formed in the fish plates coincident with the perforation 2 in the web of the rail, and on its outer end said bolt 9 is provided with right and left screw threads 10 as clearly seen in Fig. 2. These screw threads 10 extend an equal distance up the shank of the bolt 9 so that either a right or a left hand screw threaded nut may be screwed the whole of the required distance along the bolt in order to properly secure the parts together.

11 is a washer arranged about the bolt 9 next to the fish plate 3; 12 and 13 are nuts provided respectively with right and left hand screw threads. These nuts are screwed on the screw threaded portion 10 of the bolt 9 by turning them in opposite directions until they are firmly set against the fish plate 3. When in this position it will be seen that ordinary plain nuts would be liable to become loosened under the jarring of the joint, the outer nut first turning slightly in one direction whereby the inner nut will be permitted to turn an equal distance in an opposite direction. In order to provide against this tendency to loosening of the nuts, I have provided them on their adjacent faces with annular series of rack teeth 14 adapted, as the nuts are screwed together, to mesh with one another whereby they may be securely locked together. In order to accomplish this locking I first screw the inner nut 12 up against the washer 11 as tightly as it can be possibly forced without damage to the threads, the rack face 14 of said nut being directed outwardly as shown in Fig. 1. The nut 12 having been thus forcibly driven against the fish plate so as to overstrain the threads to such an extent that the jarring of the joint would be liable to rupture them, the nut 13 is likewise screwed up until its rack face 14 impinges against the rack face 14 of nut 12. A wrench is now applied to both the nuts 12 and 13, and said nuts are turned together in such a manner as to loosen the nut 12 very slightly in order to remove the overstrain therefrom and to tighten the nut 13 to a like degree, whereby the rack teeth on the adjacent faces of the nuts are caused to interlock rendering it impossible to loosen the joint without turning both the nuts in the opposite direction and, as such turning would compress and strain the metal to a degree beyond the normal, it follows, as a matter of course, that such will be impossible by accidental occurrence.

In Fig. 3, I have shown a slight variation in the form of the nut in which, in lieu of the annular rack face 14, the face of the nut is provided with a series of radial V-shaped ribs 15. I prefer to use this form of ratchet face on one only of the nuts, say the nut 12, and to use the face 14 on the nut 13, but it is evident that either or both forms may be used.

Having thus described my invention, I claim—

In a nut lock, the combination with a bolt having right and left screw thread extending equal distances along one end of two nuts provided respectively with right and left screw threads adapted to fit the respective threads on the bolt, said nuts having on their adjacent faces projecting V shaped rack teeth arranged in annular series, said teeth in the respective series being separated by V shaped notches
5 of a cross section equal to the section of and adapted to receive the said teeth, and two fish plates provided with perforations to receive the bolt and having on their adjacent faces longitudinal ribs arranged on opposite
10 sides of said perforations and adapted to rest against the web of the rail, one of said fish plates being provided on its outer side with a squared recess adapted to receive the head of the bolt whereby the same is held against rotation, substantially as set forth. 15

In witness whereof I have hereunto signed my name in the presence of two subscribing witnesses.

LOUIS DÉSIRÉ FRENOT.

Witnesses:
  CHARLES PHILIPPOT,
  LOUIS C. HENRIET.